United States Patent [19]

Sindle

[11] Patent Number: 5,173,881
[45] Date of Patent: Dec. 22, 1992

[54] VEHICULAR PROXIMITY SENSING SYSTEM

[76] Inventor: Thomas J. Sindle, 15 Roosevelt St., Staten Island, N.Y. 10304

[21] Appl. No.: 671,607

[22] Filed: Mar. 19, 1991

[51] Int. Cl.⁵ ............................................. G01S 15/00
[52] U.S. Cl. ..................................... 367/101; 367/909
[58] Field of Search .................. 367/909, 101; 342/29, 342/41; 340/903, 904

[56] References Cited

U.S. PATENT DOCUMENTS 3,842,397 10/1974 Sindle ................................. 367/111
4,015,232 3/1977 Sindle ................................. 367/111

*Primary Examiner*—Daniel T. Pihulic
*Attorney, Agent, or Firm*—Paul J. Sutton

[57] ABSTRACT

This invention provides a vehicular proximity sensing system having a plurality of preferably utrasonic distance-detector devices disposed around the vehicle's periphery and connected with a simulated vehicle display on the dashboard which display includes visual means to alert the driver to the close approach of an external object to the vehicle, in which the distance-detector devices use a coded signal characteristic of the vehicle and recognizable by the system, so as to distinguish reflections from interfering signals from other vehicles. In a preferred embodiment, the simulated vehicle display is provided with tricolor LED warning devices, wired to a computer or a box holding the LED's, and these can be illuminated by optical fibres and a vehicle representation is illuminated by a luminescent panel. A valuable option is a remote and an externally audible warning device enabling a parked vehicle to be provided with defensive means against being hit by another vehicle.

5 Claims, 9 Drawing Sheets

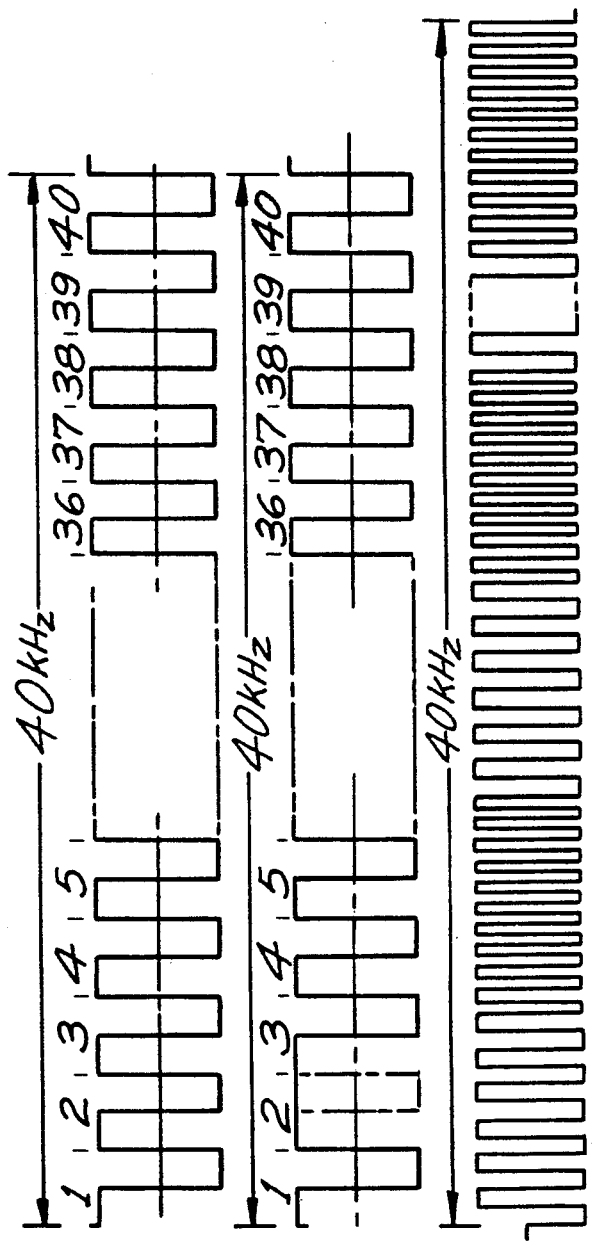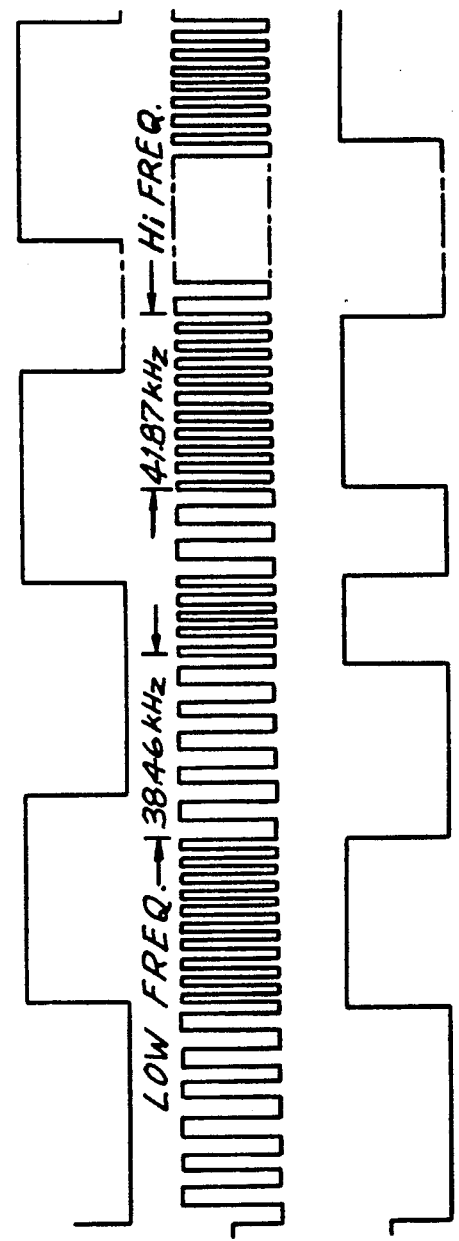

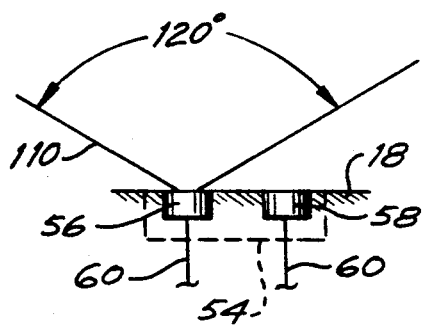
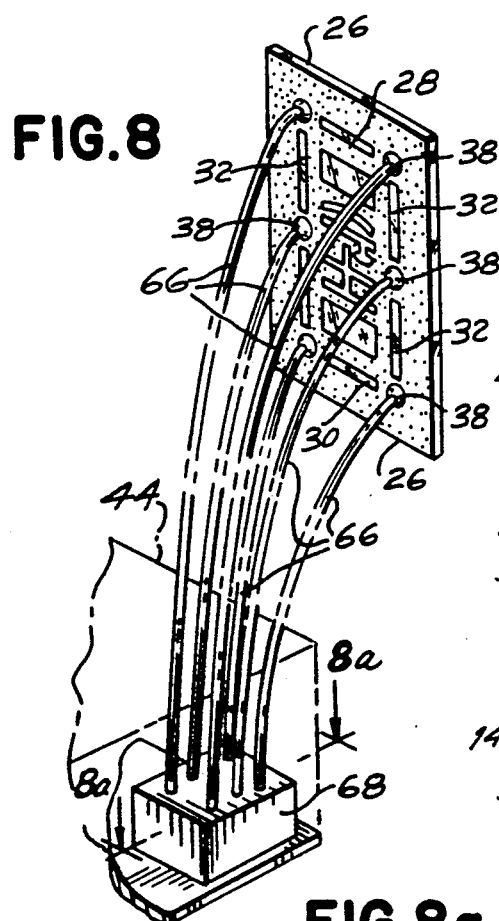
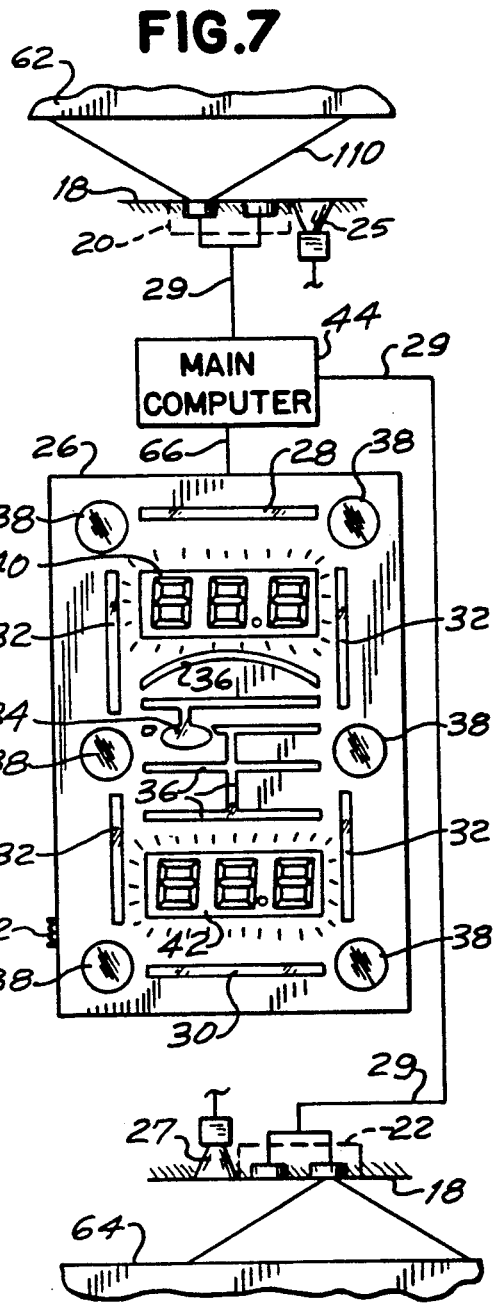
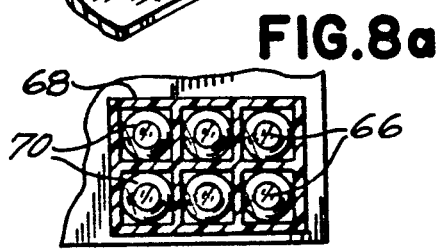

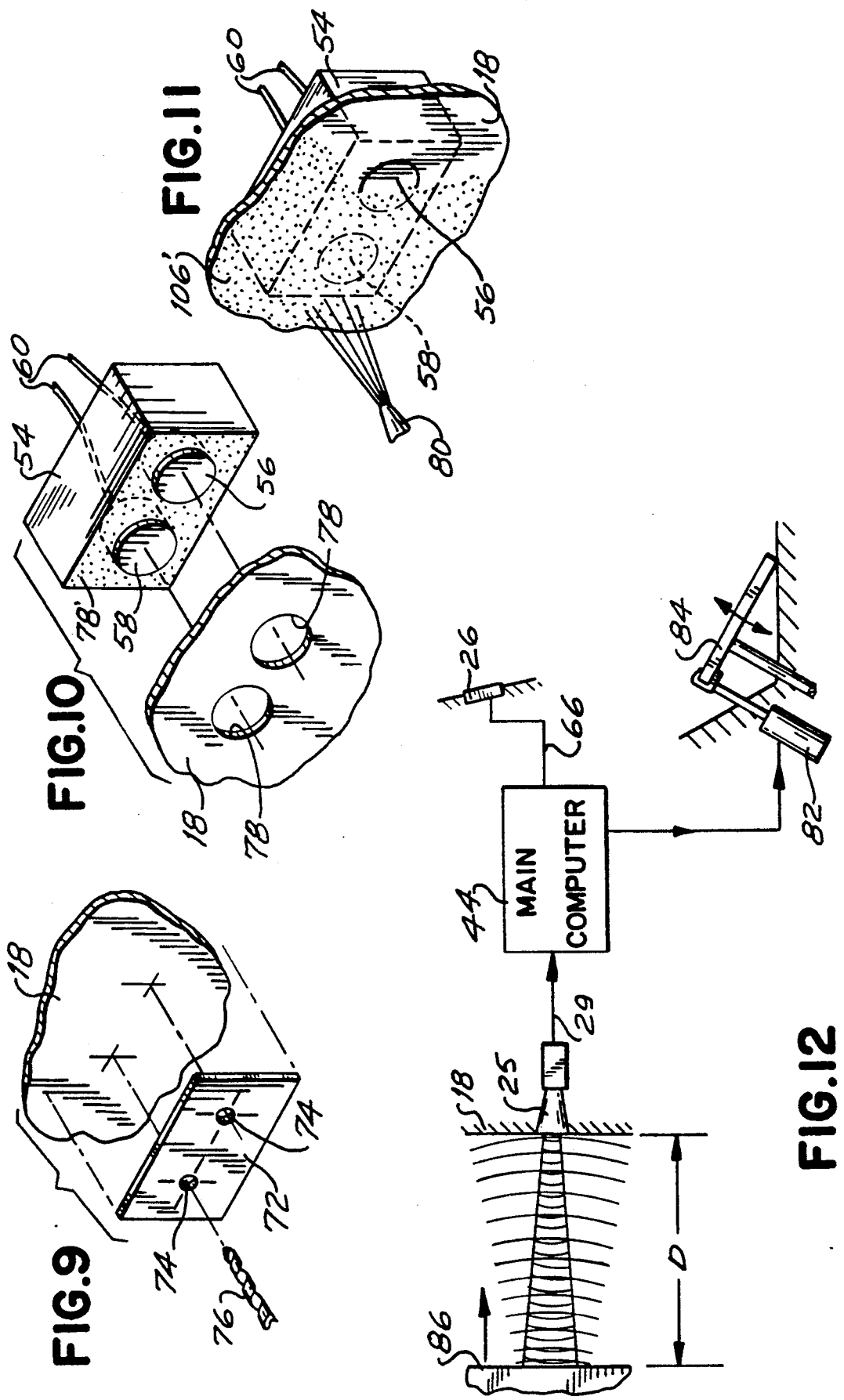

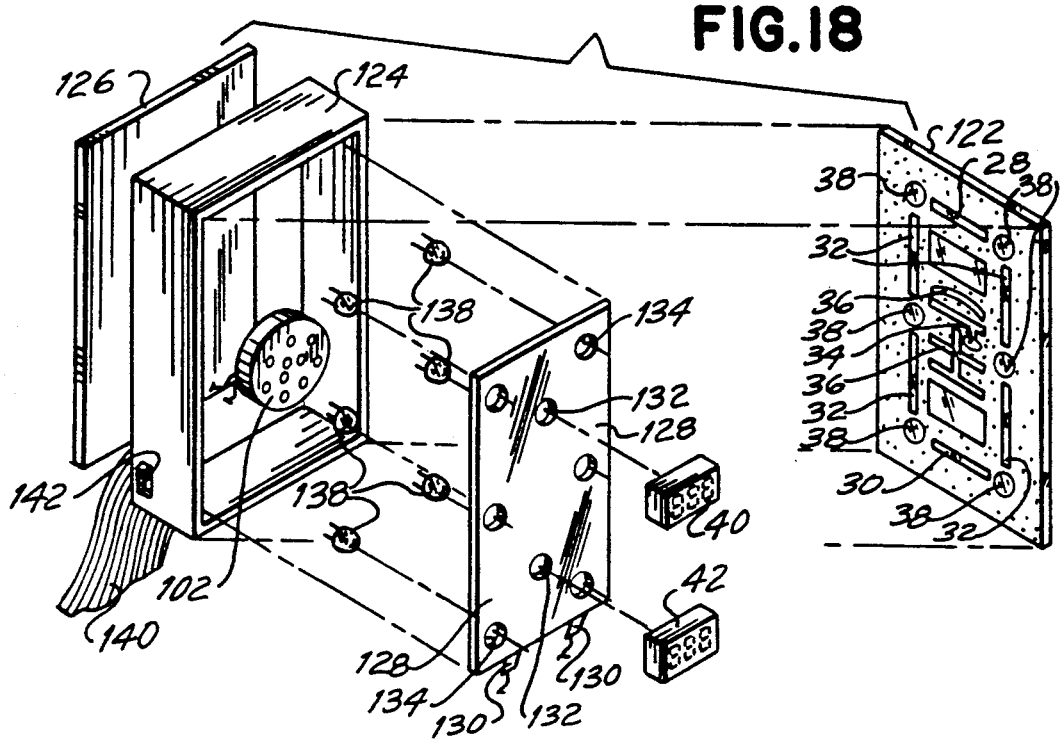

VEHICULAR PROXIMITY SENSING SYSTEM

BACKGROUND OF THE INVENTION

1. Field of the Invention

This invention relates to an improved vehicular proximity sensing system which is useful for alerting the driver of a motorized vehicle to the unduly close approach of a foreign object. Such systems are useful on the highway to reduce the risk of dangerous tailgating or to warn of the risk of sideswiping and, when equipped with audible warning means, may serve to awaken a sleepy driver wandering off-course in time to avert an accident.

A good proximity sensing system with sensitive close range detection is also valuable in parking situations, especially to help drivers with poor depth perception, or to alert the driver to the risk of collision with a more or less out-of-sight object such as a post or high kerb.

2. The Prior Art

Such useful vehicular proximity sensing systems are described and shown in my U.S. Pat. Nos. 3,842,397 and 4,015,232. These patents disclose a vehicular proximity sensing system to detect the relative approach of an external object to a motorized vehicle, the system having a plurality of reflectable energy transmitting-receiving distance-detecting devices disposed around the vehicle's periphery, and driver-alert means responsive to signals received from the distance-detector devices to alert a driver to close approach of the vehicle to the external object.

Clearly, for the purposes of the design of such a system, it is not important whether the external object is moving or the vehicle itself is moving: all that is of interest is relative movement between the two. Thus the external object can be another vehicle on the highway, such as a car, a tailgating truck or a slow-moving highway work vehicle or indeed a not readily visible stationary object such as a barrier for a construction diversion.

In my earlier patents I used ultrasonic energy signals as the reflectable energy and this provided a sensitive system that was effective for the purposes described. However, in the thirteen years that have passed since the issuance of '232 I have conducted substantial research directed towards further developing my systems to be suitable for mass production and widespread utilization as original equipment on a large number of vehicles, as well as for retrofitting to existing vehicles, and to provide useful features that were not previously envisaged.

During the course of my research it has become apparent that one of the problems associated with the large scale utilization of a vehicular proximity sensing system is the potential for false positives which may distract or annoy the driver and cause him to ignore or stop using the system.

In spite of their obvious merits, to my knowledge, vehicular proximity sensing systems have not been adopted as original equipment, and certainly have not come into general use, as have other accident avoidance systems, for example antilock brake systems and automatic air bags.

BRIEF SUMMARY OF THE INVENTION

It is one object of the present invention to provide a vehicular proximity sensing system which has a reduced susceptibility to false-positive activation.

It is a further object of this invention to provide such a system which has a reduced susceptibility to interference from external signals.

It is a still further object to provide such a system which is sensitive and reliable while being economical to manufacture.

Yet another object of the invention is to provide a vehicular proximity sensing system having new and useful features including but not limited to a multicolored driver-alert display which provides a clearly readable and appealing means of alerting, then warning the driver of the unduly close approach of an external object.

A still further object of the invention is to provide such a system which includes defensive means to deter collisions between other vehicles and the host vehicle when parked.

Accordingly, the present invention provides a vehicular proximity sensing system to detect the relative approach of an external object to a motorized vehicle, the system having a plurality of reflectable energy transmitting-receiving distance-detecting devices disposed around the vehicle's periphery driver-alert means responsive to signals received from the distance-detector devices to alert a driver to close approach of the vehicle to the external object and electronic signal-processing means for coding a reflectable energy signal to be transmitted by the distance-detector devices to have a unique character distinguishing the signal from signals emitted by other vehicles equipped with a similar vehicular proximity sensing system wherein the electronic signal-processing means includes received-signal analyzer means to recognize said coding in received signals and accept or reject them accordingly.

False positives are most likely to be produced by interfering signals generated by similar systems on other vehicles, but other, extraneous sources may give rise to interference. A system subject to interference is not suitable for mass production and is unlikely to be adopted by the quality vehicle manufacturers who usually introduce new technology.

Rather than trying to increase sensitivity, signal strength or signal-to-noise ratio, which is the sort of approach adopted by radar detection equipment manufacturers faced with a related problem, I have found that an excellent solution to this problem of false positives can be obtained by key-coding the transmitted signal to render it unique and providing electronic means to recognize it.

While several forms of radiation can be transmitted to provide the reflectable energy, for example, electromagnetic radiation including radio waves (radar), infrared or microwave radiation, a preferred form of radiant energy is ultra-sonic and the distance-detecting devices comprise ultrasonic transmitting-receiving transducers, preferably operating within a frequency range of from 30 to 100 kilohertz (KHz), typically from 40 to 45 KHz.

In a preferred embodiment, the transmitted signals are modulated or chopped to characterize them while the electronic signal-processing means generates coded signals in pulses emittable from the ultrasonic transducers in a predetermined sequence recognizable by said received-signal analyzer means, thereby to further characterize the signal transmissions from the vehicle as unique to the vehicle so as to reduce the probability of responding to external energy transmissions. Also, these signal pulses can be transmitted in a clockwise or counterclockwise sweep around the vehicle. The speed of the sweep can be selectable and settable at the factory to assist in characterizing the vehicle's transmissions.

Alternatively, the system can include a driver-operable control to adjust the speed of the sweep to assist in avoiding interfering signals when they occur.

The reflected signals can then be identified by their sequence or their timing or both as well as by the transmitted signal's modulation or modification. The electronic-systems processing means can comprise an onboard computer or microprocessor and related electronic componentry. Such technology would be unduly expensive for relatively modest aftermarket production quantities but the design and production costs of the customized chips or programming can readily be justified for original equipment supply.

Preferably, but without limitation, the driver-alert means includes a simulated vehicle display having an illuminated vehicle representation provided with a plurality of illuminating devices responsive to different distance-detector devices to give the driver a visual indication of the location of his close approach to an external object. The system can also comprise a pair of long-range distance detectors at the front and rear of the vehicle and wherein the simulated vehicle display includes a pair of illuminated digital readout devices to give a visual indication of the numeric distances detected by said long-range distance detectors. Also, said illuminating devices can have a tricolor capability displaying green for a normal condition, yellow or amber for a close approach to an external object or red for a dangerously close approach. With advantage, the simulated vehicle display can include a luminescent panel providing illumination for a vehicle representation.

It is also valuable, but not essential for the driver-alert means to comprise an audible alert device, which could for example be a tone or a pulsating buzzer and can include a voice generator to provide a voice announcement to alert the driver to the close approach of the external object.

A vehicular proximity sensing system according to this invention can advantageously be designed with said distance-detector devices each having a transmitting and a receiving surface being capable of being mounted flush with the vehicle's skin after cutting fitting openings therein, said distance-detector devices being mountable behind the skin, whereby the vehicle skin can be re-sprayed to render said distance-detector devices substantially invisible.

To protect them from shocks and corrosion said distance-detector devices can each be substantially encased in a block of elastomeric material mountable at the vehicle's skin to extend inwardly thereof.

In a particularly novel and useful embodiment, the system can include an externally audible or visible warning device actuatable by the close approach of an external object to the vehicle. If the driver is also provided with a handholdable remote control device for the system whereby the driver can activate the system upon leaving the vehicle parked and deactivate upon return then the vehicle is ingeniously provided with defensive means against collision or unauthorized entry while parked.

Further objects of the present invention and its features will suggest themselves to those skilled in the art upon a reading of the present specification, together with the drawings annexed hereto wherein, throughout the several views, similar reference characters denote similar elements.

BRIEF DESCRIPTION OF THE DRAWINGS

FIG. 2a is a schematic representation of an unmodulated ultrasonic signal;

FIG. 2b is a schematic representation of a modulated or coded ultrasonic signal;

FIG. 3a is a schematic representation of a waveform modulated by a technique employing two frequencies;

FIG. 3b is a schematic representation similar to FIG. 3a wherein the two frequencies are used as a digital equivalent derived from a pulse code;

FIG. 3c is a schematic representation with a changing pattern to give the waveform a unique code;

FIG. 3d is a schematic representation similar to FIG. 3c with a changing pattern as a digital equivalent derived from a pulse coded modulation receiver circuit.;

FIG. 6 is an enlarged diagrammatic view of a close-range distance detector used in the system shown in FIG. 1;

FIG. 7 is a partial view similar to FIG. 1 showing, diagrammatically, the vehicular proximity sensing system of the invention in use in a parking situation;

FIG. 8 is a perspective view of a fiber optic system that can be used to light each of the LEDs around the simulated vehicle display of FIG. 1;

FIG. 8a is a section on the lines 8a–8a of FIG. 8;

FIG. 9 shows the use of a template to mark a vehicle skin for the installation of a close-range distance detector being a component of the vehicular proximity sensing system of FIG. 1;

FIG. 10 shows a close-range distance detector being installed;

FIG. 11 shows a vehicle skin being sprayed after installation of the close-range distance detector shown in FIG. 10;

FIG. 12 is a schematic view showing how a front-mounted long-range distance detector can be coupled with the vehicle's brake pedal;

FIG. 18 is an exploded view showing some of the details of construction of a simulated vehicle display which can be used in the system of FIG. 1;

FIG. 19 is a perspective view of an alternative construction for some of the components of the simulated vehicle display of FIG. 18;

FIG. 20 is a plan view of another alternative simulated vehicle display;

DETAILED DESCRIPTION OF THE INVENTION

Figure 1:
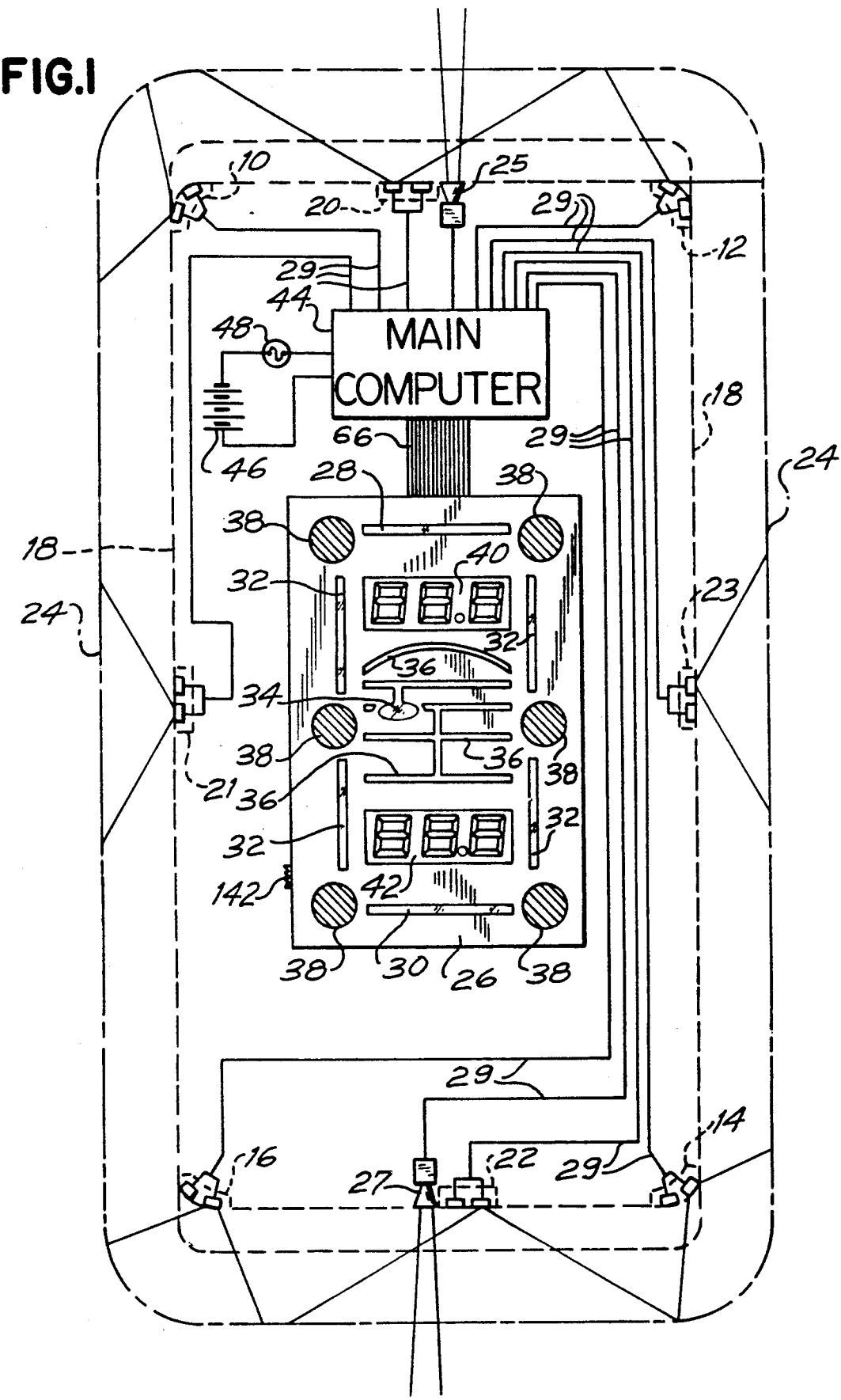
FIG. 1 is a diagrammatic view of a vehicular proximity sensing system according to the present invention which utilizes ultrasonic transmitting and receiving devices to detect the proximity of external objects.

Referring now to FIG. 1 of the drawings a vehicular proximity sensing system comprises eight ultrasonic distance detectors of which four close-range distance detectors 10, 12, 14 and 16 are disposed at the lower corners of a vehicle skin 18 shown in broken outline. Two more close-range distance detectors 21 and 23 are disposed at the mid-points of the lower sides of the vehicle skin 18. Substantially at the mid-points of the lower periphery of the vehicle skin 18 at the front and rear of the vehicle are disposed two more close-range distance detectors 20 and 22 and two long-range distance detectors 25 and 27.

In the middle of FIG. 1 is a near-actual-size, generally rectangular, simulated vehicle display 26 which schematically illustrates the host vehicle for the vehicular proximity sensing system by means of front- and rear-end indicator bars 28 and 30, side indicator bars 32, a steering wheel 34, and interior markings 36. The simulated vehicle display 26 further includes six circular indicator lights 38 disposed at the corners and sides of the simulated vehicle to correspond with the four corner close-range distance detectors 10-16 and the side close-range distance detectors 21 and 23 and provide a visual indication of the approach of an external object into the sensitized area in the vicinity of the respective close-range distance detector. Two digital readout LEDs 40 and 42 (an LED is a light emitting diode) provide continuous readouts from the front and rear long-range distance detectors 25 and 27, respectively, in conjunction with the front and rear close-range distance detectors 20 and 22, so that a driver may continually monitor his or her distance from a car, truck or other vehicle in front of them and from a trailing vehicle, and may brake or accelerate to adjust that distance as desired and especially to keep it at a safe level which avoids tailgating. The long-range distance detectors 25 and 27 can be designed to have any convenient range, for example up to about 90 or 120 ft. and should preferably read down to the range at which the close-range detectors 20 or 22 can take over.

The digital readout LEDs 40 and 42 can read in feet or meters or can be switchable to one or the other, either by the driver or at the factory. They are preferably of the numeric display type which uses seven elongated sectors to make up the digit eight and selected ones of the seven to make the other nine digits, and preferably also, each digital readout LED 40 or 42 can display a three or four digit number with one place of decimals.

The simulated vehicle display 26 is located on the vehicle's dashboard oriented in parallel with the vehicle and positioned to be easily viewed by the driver, optionally with an aircraft-style, switchable, through-the windshield projected display. The display 26 is preferably fully illuminated when the ignition is turned on, and optionally, this illumination may dim when the parking lights are turned on to provide a display which is easily readable, both day and night. The preferred embodiment of this invention employs tricolor illumination, green for normal, amber to alert or warn and red for danger. An audible warning device, for example a buzzer (not shown) can be provided to operate in conjunction with the visual display to provide a relatively loud warning in dangerous situations as an external object approaches the vehicle, or vice versa, and, optionally, to emit sound of increasing intensity as an amber alert is displayed. If desired, the audible warning can be settleable by the driver, to be on or off, or to have a selected volume.

A second simulated vehicle display 26 can be provided in the rear of the vehicle, where it may be easily read by a driver turning around to see out of the vehicle's rear windows, to assist with reversing, and this may be of particular value in monitoring the positioning of the vehicle's front fenders, or corners. Alternatively, or in addition, an aircraft-style projected image could be displayed through the rear window.

The circular indicator lights 38 and the digital readout LEDs 40 and 42, as well as the eight close-range distance detectors 10-16 and 20-23 and the two long-range distance detectors 25 and 27 are all coupled with a main computer 44, which can conveniently be located in a box under the dashboard of the vehicle, and is energized by the vehicle battery 46 to which the computer 44 is connected through a fuse 48 or other protective device.

Each close-range distance detector generates a sensitized area in its vicinity the approximate range of which is indicated by a phantom-line limit 24. This close range detection limit 24 is pre-selected at the factory and will normally be under two feet and can advantageously be from six to twelve inches, but is preferably about nine inches. Alternatively, the system could be designed so that the close range detection limit 24 is selectable by the driver according to his or her ability to drive more or less closely to an external object and the detection limit could be switchable by the driver, or automatically switchable or adjustable by a vehicle speed sensor to have a low value for parking, such as that described, and a higher value at higher speeds for example from twelve to twenty-four inches and preferably about eighteen inches. The particular design of the detectors will be described in more detail subsequently, suffice it to say for now that each of the close-range distance detectors comprises a transducer block which has an ultrasonic transmitter and receiver. Both the close-range distance detectors 10 to 16 and 20 to 23 and the long-range distance detectors 25 and 27 are connected to the main computer 44 by individual transmission lines 29 which can also be used to power the transducers, if desired.

The transmitted signals can be key-coded to have a distinctive character unique to a given vehicle in a number of ways. For example, the emitted signal can be frequency keyed or pulse-code modulated using two or more frequencies, as indicated in FIGS. 2a, 2b, 3a, 3b, 3c and 3d.

FIG. 2a shows a normal unmodulated 40 KHz signal having a pulse train of 40 pulses each having a positive amplitude indicated by a "one" and a negative amplitude indicated by a zero.

FIG. 2b shows how a code could be created from FIG. 2a by combining the second and third pulses to form a continuous positive amplitude between these pulses, thus creating a code from this coding, a transmission pulse unique to the host system is created. Any reflected signal reaching a receiver can be examined for a similar coding, for example by comparing the received signal with the transmitted signal, to determine whether it originated from the host system and should be passed for processing or whether it is a foreign signal that should be rejected or ignored. For example, another signal characterized by missing its thirty-eighth kilocycle would be rejected as being different. This technique provides a simple key code. The key code can be further characterized or rendered more distinctive by timing or sequencing the transmitted signal so that only signals arriving in an expected time window are accepted.

FIG. 3a shows a pulse-coded modulation technique consisting of two frequencies 38, 46 KHz, to indicate a zero and a 41, 67 KHz to indicate a one. The transmission pulse consists of 40 pulses of equal width alternating between 38.46 KHz sequentially starting with 38.46 KHz to indicate a zero.

FIG. 3b shows the digital equivalent of the transmission pulse from FIG. 3a, as would be derived from a pulse-coded modulation receiver circuit.

FIG. 3c shows how a unique code can be transmitted by changing the pattern of the two transmission pulses 41.67 KHz and 38.46 KHz respectfully.

FIG. 3d shows the digital equivalent of the transmission pulse from FIG. 3c as would be derived from a pulse-coded modulation receiver circuit.

In using pulse coded modulation as shown in FIGS. 2a, 2b, 3c and 3d, a reflected signal reaching a receiver can be examined for a similar code, for example, by comparing the received signal with the transmitted signal, using the analyzer within the computer to see if the pulse originated from the host system. If it has, it then will go on to warn the driver of an external object. If it is a foreign signal, it will be rejected or ignored. As one can see, by using two frequencies, a simple pulse coded modulation technique is provided.

Greater coding flexibility can be obtained by transmitting coded signals from the several ultrasonic transducers in a predetermined pattern from one sensitized area to another.

Figure 5:
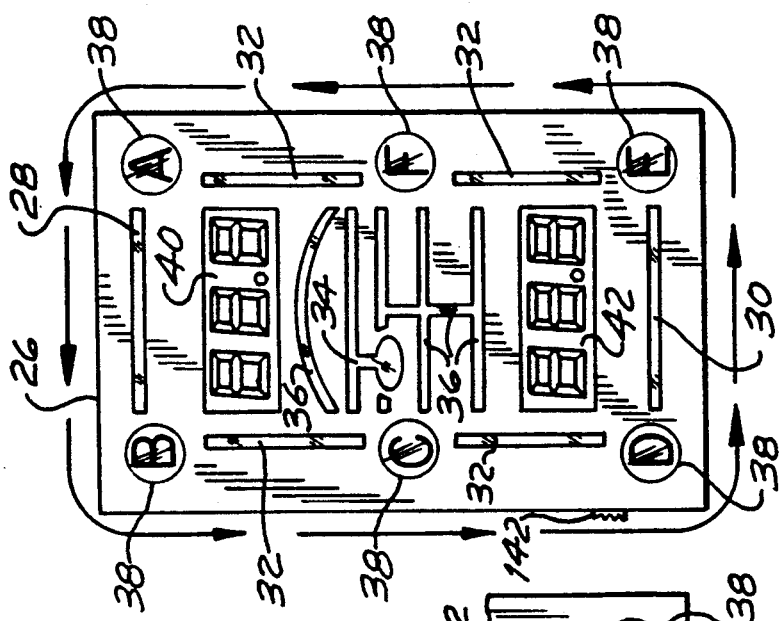
FIG. 5 is a view of a simulated vehicle display depicted in FIG. 1 which has been labelled to illustrate a counterclockwise activity sequence.
Figure 4:
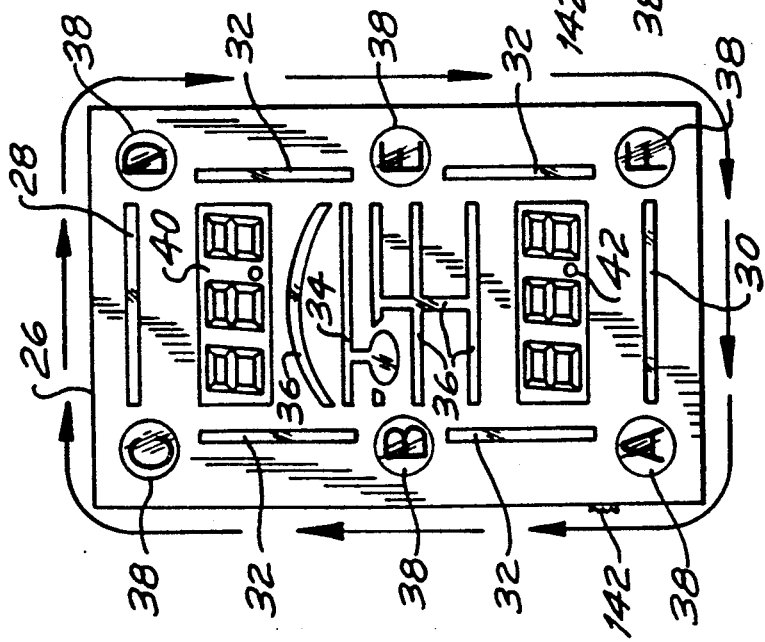
FIG. 4 is a view of a simulated vehicle display depicted in FIG. 1 which has been labelled to illustrate a clockwise activity sequence.

FIGS. 4 and 5 show sequencing patterns for the six close-range distance detectors 10–16, 21 and 23 by means of the six indicator circles 38 which monitor the activities of these detectors, and are marked with the letters A to F to indicate their sequence of activity in a sweep commencing, for example with the left rear close-range distance detector 16 the corresponding indicator light 38 for which is labeled A, and proceeding in a clockwise sequence to the right rear close-range distance detector 14 and indicator light 38 labeled F after which the sweep is repeated. The computer 44 is programmed to reject signals not arriving in the proper sequence or at an expected time interval rendering ir quite unlikely that a signal from another vehicle will be accepted.

Figure 5A:
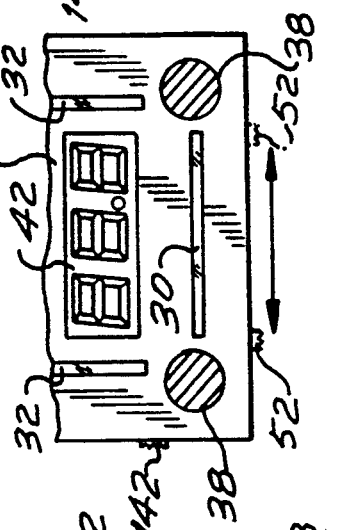
FIG. 5a is a partial view of a modification showing a manual slide to control the speed of activity sequence around the simulated vehicle display of FIG. 1.

FIG. 5 shows a similar sweep proceeding in a counterclockwise sequence from the front right, labeled A to the side right, labeled F in FIG. 5a. If desired, the programmed speed of the sweep can be increased or decreased by the driver by means of a slide control 52 increasing the probability of not interfering with another vehicle, or of excluding possible interference from another vehicle. If a driver does experience interference, adjusting the speed control 52 may eliminate it.

In this way, the speed of sweep and the transmission around the vehicle may be different from those of any other vehicle. These features along with the coding of individual signals, which could also be coded differently for each of the close-range distance detectors, can provide sufficient coding for the millions of vehicles on the roads to have distinct key codes.

In use, in normal operation, with the ignition switched on, and with no external object positioned within the detection limit 24, the simulated vehicle displays 28, 30, 34 and 36 are completely blue, with the indicator circles 38, being green or changing color when coming close to an external object. The digital readout LEDs 40 and 42 are red and display the distances to reflecting objects respectively in front of and behind the vehicle.

Should any of the indicator circles 38 or the digital readout LEDs 40 or 42, not be illuminated, then the driver should rely on visual judgment rather than the vehicular proximity sensing system with regard to a corresponding sector of the vehicle, and have the system repaired.

When an external object, or indeed any substantial object that reflects a detectable signal crosses the close range detector limit 24, approaching nine inches from the vehicle, then the driver is alerted as to the proximity and location of the external object by a corresponding indicator light 38 turning amber and, possibly also by an audible warning, if provided, and is thus prompted to take appropriate evasive action. For example, should the driver pull out to his left to change lanes on the highway while a vehicle in the outer lane is positioned in his rearward blind spot, the lower left indicator light 38 will activate, turning amber before a collision occurs. Should the external object continue to approach the vehicle, or the vehicle approach the external object, to a proximity of about four to six inches, depending upon the setting, the corresponding indicator circle or circles 38 will turn red and the audible warning or buzzer will sound indicating the danger of a collision. Plainly, the front and rear close-range distance detectors 20 and 22 are not likely to be activated on the highway, (it is to be hoped), but they are useful in close parking situations where the long range distance detectors 25 and 27 are less sensitive or less useful. When either close-range distance detector 20 or 22 is activated by the approach of an external object into its sensitized area past the detector limit 24, it takes over the corresponding LED 40 or 42 first displaying flashing red eights then if desired, optionally flashing with increasing frequency as the external object approaches while the buzzer sounds in a similar manner. In an optional embodiment of this invention, the computer 44 monitors changes in the distance readings from the long-range distance detectors 25 and 27 to predict the future position of an external object and can use the LEDs 40 and 42 to give a flashing red danger warning in a similar manner. This can be of value on the highway, for example, to warn the driver of a high speed vehicle approaching from behind in the outer lane, or that a forwardly detected object, or vehicle, such as a highway work vehicle, is especially slow, or even stationary. Preferably, this feature is disabled at low parking speeds below ten or perhaps twenty miles per hour, to allow the close-range distance detectors 20 and 22 to use the digital readout LEDs 40 and 42.

An important feature of this invention is that the signals radiated from the vehicle are coded so that any reflected signals can be identified as emanating from the host vehicle, so as to avoid interference with other vehicles or false readings from other vehicles carrying a similar or comparable system, or interference from extraneous signals.

Referring now to FIG. 6, each close-range distance detector 10-16 and 20-23 can comprise an ultrasonic transducer block 54 having a transmitting transducer 56 and a receiving transducer 58 spaced apart at an optimal distance for the receiving transducer 58 to detect the return of reflected signals from the transmitting transducer 56. The transmitting and receiving transducers 56 and 58 are connected to the computer 44 by signal wires 60.

The transmitting transducer 56 emits an ultrasonic signal having the key-coded characteristics described above, in a generally conical pattern perpendicularly off the face of the transducer 58 which is mounted flush with the vehicle skin 18, and as is marked on the drawing, this signal fans out with a scope of about 120° and this conical pattern defines the sensitized area around the transducer block 54. It should be noted at this time, that any number of these blocks 54 may be placed around the vehicle, depending on the vehicle size, or desire of the owner. Again there would be a corresponding number of indicator lights 38 around the simulated vehicle display.

FIG. 7 shows how the simulated vehicle display 26 responds in a parking situation. In the particular situation shown both a front-end external object 62 and a rear-end external object 64 have come within the range of the front and rear close-range distance detectors 20 and 22. (A highly unlikely, but not impossible situation.) In response to receipt of signals from the close-range distance detectors 20 and 22, the digital readout LEDs 40 and 42 are switched over by the computer from the long-range distance detectors 25 and 27 respectively and are taken over by the front and rear close-range distance detectors 20 and 22 which display red flashing eights to warn of imminent danger of hitting (or being hit by) an external object whereupon the red flashing eights and the buzzer activate to warn of immediate danger.

FIGS. 8 and 8a show one possible arrangement of six fiber optic lines 66 which extend from the back of the simulated vehicle display 26 mounted in the vehicle's dashboard, where each fiber optic line terminates in one of the indicator circles 38. The other ends of the fiber optic lines 66 emerge from a light box 68 which can be mounted adjacent the computer 44 in an accessible position behind or beneath the dash. The light box 68 has six tricolored lamps 70 each offering a choice of green, amber or red and being activated under control of the computer 44 by signals from a respective one of the close-range distance detectors 10-16, 21 or 23, and their luminescence is transmitted to the indicator circles 38 by the fiber optic lines 66. This fiber optic system is economical and simple to install and provides improved serviceability: a blown lamp 70 can be more easily changed in the light box 68 than in the confines of the back of the dashboard up behind the simulated vehicle display 26.

Referring now to FIGS. 9 to 11, a close-range distance detector in the form of a transducer block 54 can be readily installed in the skin 18 of a vehicle with the aid of a template 72 which is provided with two marker holes 74 spaced apart to provide center points for the circular faces of the transducers 56 and 58. The vehicle skin 18 is marked with a center punch or drill 76 and then drilled out to size as shown in FIG. 10 to provide openings 78 to receive the transducers 56 and 58. The transducer block 54 is a rectilinear, brick-shaped block of silicone rubber molded around the transducers 56 and 58 which have a cylindrical shape, as shown. The transducer signal wires 60 emerge from the back of the block 54 and are run in any convenient manner to the computer 44. The outer face 78, of the transducer block 54 is coated with a strong, pressure-sensitive adhesive, and the transducers 56 and 58 project from the block 54 a distance about equal to the thickness of the vehicle's skin so as to be flush with it. The transducer block 54 can now be mounted behind the vehicle's skin by pressing it thereagainst with the faces of the transducers 56 and 58 received in the openings 78 to lie flush with the outer surface of the vehicle skin 18, for which purpose they can be adjustably mounted in the transducer block 54, if desired. As shown in FIG. 11, vehicle skin 18 can be sprayed by a paint gun 80 to render the transducers 56 and 58 substantially invisible. The silicone rubber material of the block 54 effectively protects the transducers 56 and 58 from shocks or damage while the adhesive holds the block in place.

Thus a simple installation procedure is provided which is suitable for either production line assembly or retrofitting to existing vehicles. Since the transducers 56 and 58 are ultrasonic, it can theoretically be expected that dirt will not be a problem as the ultrasonics should dislodge it, at least from the transmitting transducer 56.

FIG. 12 shows schematically an optional additional use for the signal received from the frontal long-range distance detector 25 which in this embodiment is coupled through the computer 44 to a brake-actuating solenoid 82 which in turn is connected to the vehicle's brake pedal 84. The computer or microprocessor 44 is programmed or designed to operate the solenoid 82 in a pulsating manner to generate a gentle or steady braking effect rather than pulling the brake down dangerously in a single, sharp potentially destabilizing braking action.

When the long-range distance detector 25 sends the computer a signal indicating the host vehicle is moving dangerously, or unwisely close to another vehicle 86, the computer 44 can activate the digital readout LED 40 in the simulated vehicle display 26, flashing it in amber or red while displaying either the actual distance or a set of eights. Especially for a red, imminent danger condition, an audible warning may also sound. If the computer now pulses the brake 84 by means of the solenoid 82, this action combined with the audio-visual alerts should be adequate to make the driver aware of a situation to which he may not have been paying attention, and give him time to brake hard, if needs be, to avoid a collision. If the vehicle has a pulsating anti-lock braking system, the computer output could be coupled to that to exploit its brake-actuating system.

Figure 13:
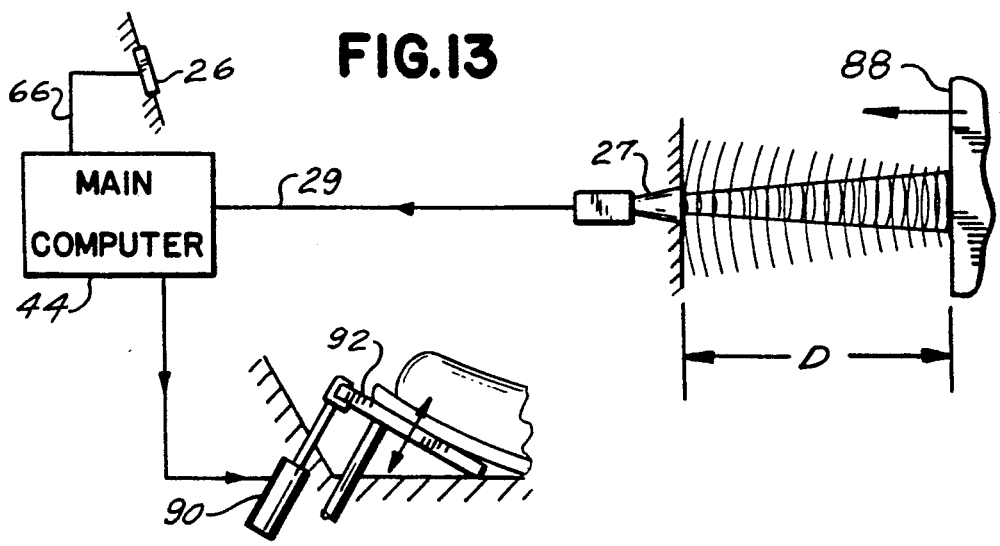
FIG. 13 is a schematic view showing how a rear-mounted long-range distance detector can be coupled with the vehicle's accelerator pedal.

FIG. 13 shows an optional system similar to that of FIG. 12 which utilizes a signal from the rearward long-range distance detector 27 when another vehicle 88 comes too close, or tailgates in a threatening or dangerous manner, to flash the digital readout LED 42 on the simulated vehicle display 26, and sound an audible warning, if provided, and to pulsate the vehicle's accelerator pedal 92 by means of a solenoid 90 which is coupled to the computer 44.

Neither of the automated control systems of FIGS. 12 or 13 dominates the pedals: the driver is always free to override the action of the solenoids 82 and 90.

Figure 14:
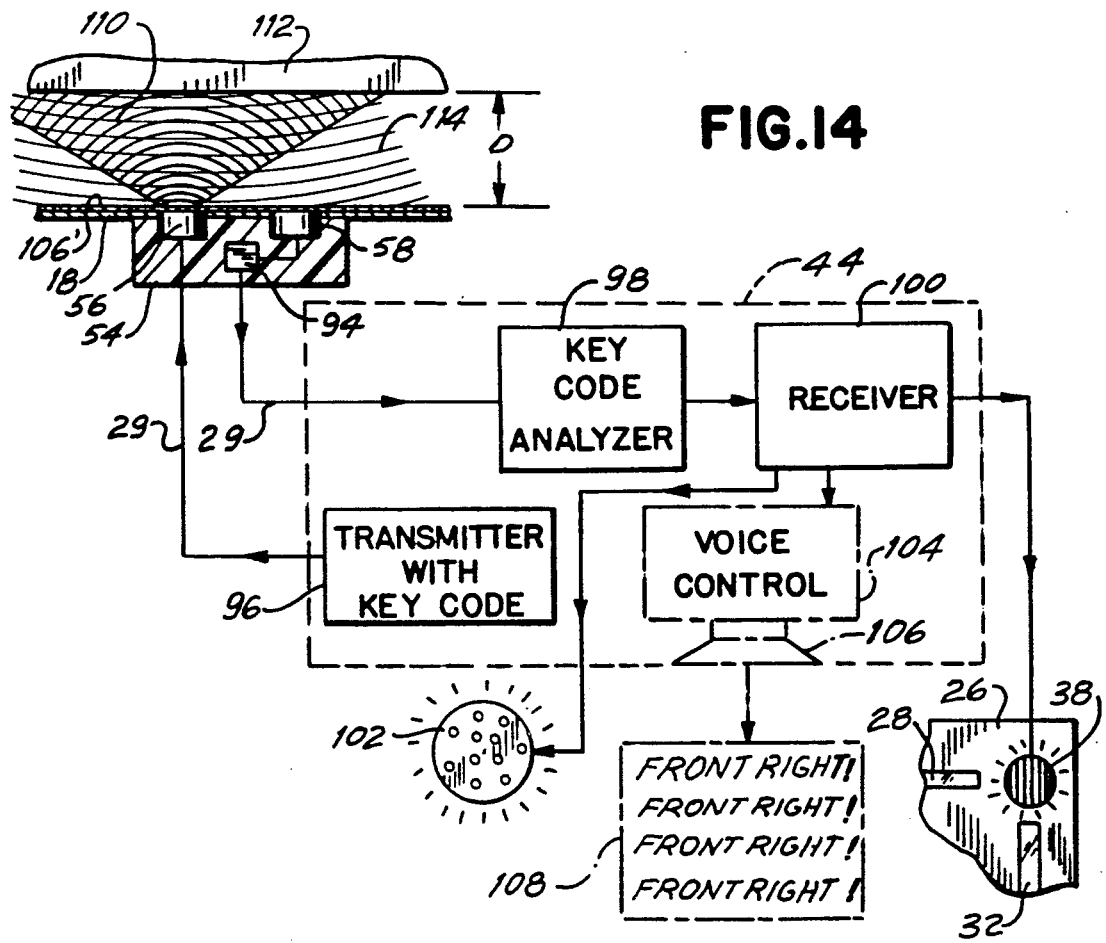
FIG. 14 is a diagrammatic view of some of the information processing components of a modified vehicular proximity sensing system similar to that shown in FIG. 1 but provided with some additional, optional features.

FIG. 14 shows a typical sensitized area of the vehicle provided with a modified transducer block 54 and a modified computer system 44. As suggested by the corner portion shown of the simulated vehicle display 26, this transducer block 54 is located at the front right-hand corner of the vehicle.

The transducer block 54 is modified by the inclusion of a booster chip 94 to amplify any reflected signal received by the transducer 58 which is of course substantially weakened as compared with the transmitted signal. The booster chip 94 is also well protected from shock or corrosion by being encased within the silicone rubber body of the transducer block 54 and is located at the source of the received signal, or as close to the receiving transducer 58 as is feasible so as to increase the signal-to-noise ratio before the signal becomes further attenuated by transmission along lines 29. As shown in this figure, the computer can comprise several or all of the signal-processing or information-processing elements of the system including a signal-transmitter 96 provided with key-code means to generate a distinctively coded signal for emission by a transmitting transducer 56, a signal analyzer 98 for examining signals received by the transducer 58 which passes recognized signals to a receiver 100 which manages several warning devices, notably the indicator light 38 on the simulated vehicle display 26 (via the light box 68 and an optical fiber 66) an audible warning buzzer 102 mounted near the driver, and a voice generator including a voice control chip 104 and a speaker 106 which can produce a spoken output indicated schematically at 108.

Figure 21:
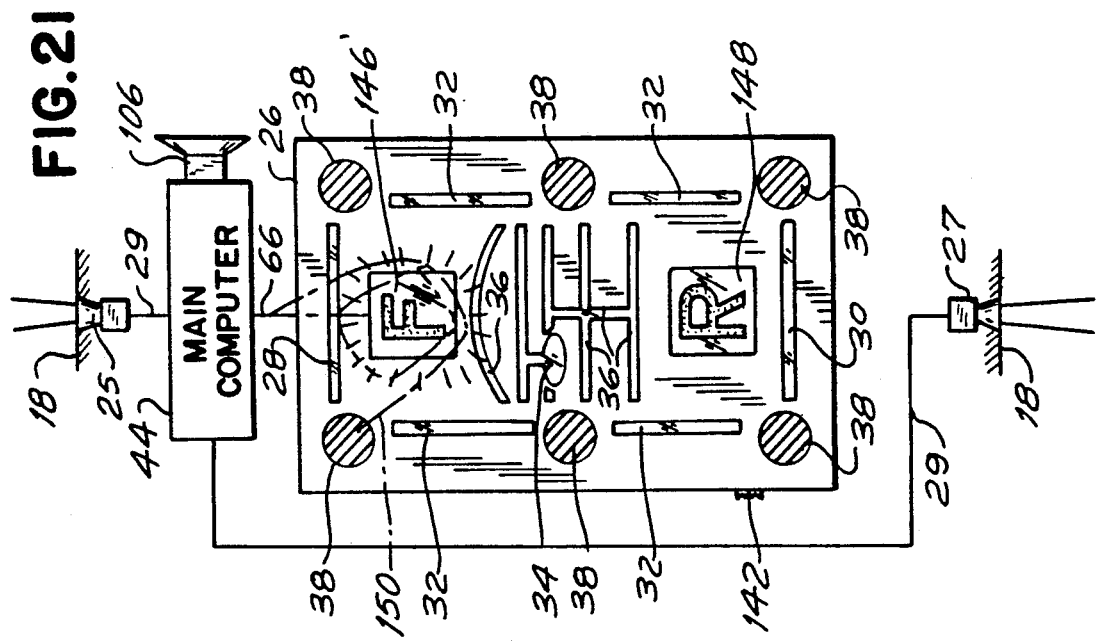
FIG. 21 shows schematically how the system can function in an embodiment that uses a touch button for a voice generator; and for a readout of distance.

As before, the transducer block is here shown adhesively attached to the vehicle's skin 18 over which a layer of paint 106' has been sprayed. An ultrasonic signal emitted in a cone 110 from the transmitting transducer 56 is reflected by an external object 112 in a diverging pattern 114 so that the signal is dispersed and greatly weakened when it is picked up by the receiving transducer 58, explaining the desirability of including the booster chip 94. The voice generator might issue a general warning such as "You are driving within nine inches of an external object.", but the voice control chip 104 is preferably programmed with a range of simple warnings to give a verbal indication of the position of the external object, for example "Front right!" according to which close-range distance detector has sent a warning signal to the computer. As described above, it is preferred that the ultrasonic signals are transmitted in a series of pulsed sweeps around the vehicle. This pulsed signal, when a reflection is received can be used to flash the indicator lights 38 and pulsate the buzzer 102 or the voice generator 108. The voice generator is normally an alternative to the buzzer 102, but the buzzer could be used to override or drown out the voice generator when the danger becomes immediate. FIG. 21 to which reference will be made subsequently herein, shows a modified simulated vehicle display 26 for use with a voice generator.

Figure 15:
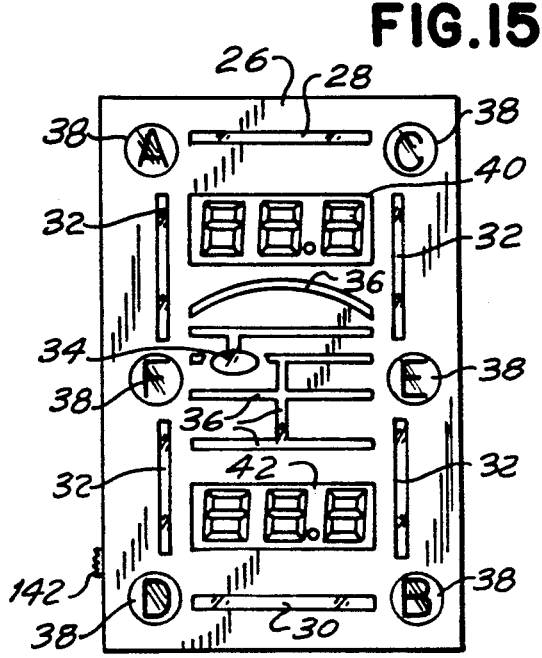
FIG. 15 is a view similar to FIG. 4 showing an alternative transmission pattern.

FIG. 15 shows another sequence in which the detection signals can be transmitted to the sensitized areas around the vehicle, the indicator circles 38 being labeled to show the sequence alphabetically as proceeding from front left (A) to right rear (B), to front right (C), to rear left (D) to right side (E), to left side (F) and back to front left (A) for the cycle to be repeated. If the computer 44, or the signal analyzer 98 is programmed to recognize the whole sequence, there are 120 unique codes with which the signal may be coded. If the analyzer 98 recognizes the starting point of the sequence, 720 unique patterns are obtained. When these are multiplied by the different ways in which the signal itself may be modulated, a significant number of unique combinations is produced and this can be further enhanced to a large number by monitoring the timing of the sweep around the vehicle and the associated signal pulse length. While this should provide enough combinations for each vehicle to have a uniquely characterized signal, a driver-actuatable control, such as the slide control 52 provides a safeguard against overlaps, administrative mistakes or other errors that lead to interference, enabling the driver substantially to reduce or eliminate such interference. In this way, a system is provided which is well characterized with adequate coding to be suitable for use by millions of vehicles.

Figure 16:
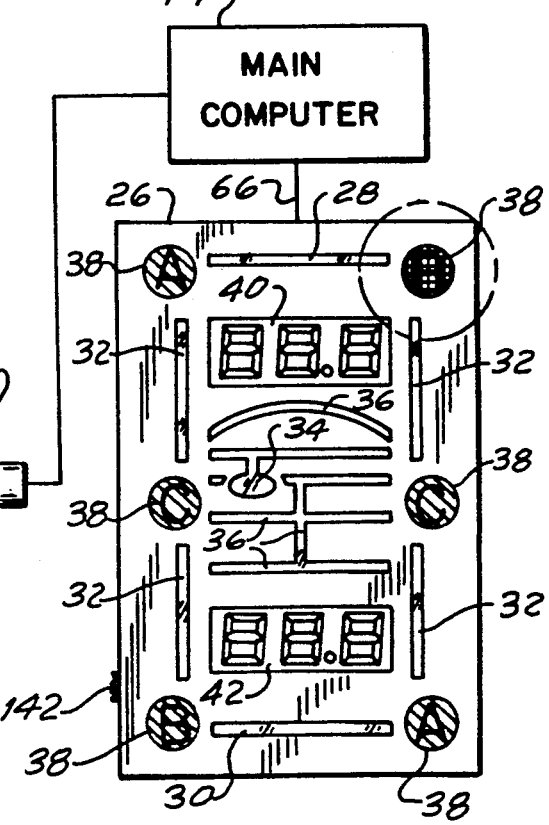
FIG. 16 is a view similar to FIG. 15 which also shows a computer and a speaker unit.

FIG. 16 shows an embodiment of the invention in which the sensitized areas around the vehicle are activated in pairs by transmitting to two close-range distance detectors at one time adding additional combination possibilities and reducing the prospect of picking up a signal from another vehicle. In this embodiment front left and right rear (A) are activated first, followed by front right and left rear (B) and then both sides together (C). The phantom-line circle around the indicator light 38 indicates the front right of the car is in danger by changing from flashing green to flashing amber, and then flashing red as the danger becomes immediate. Alternatively the indicator lights 38 can be non-flashing and permanently illuminated green while the system is on and no external object is detected, even though the ultra-sonic transmissions are pulsed. This is more restful to the driver and gives a flashing amber signal more attention-getting character, by the change to both flashing and amber rather than just a color change.

As shown in FIG. 16, the flashing warning is accompanied by a pulsed vocalization "Front right!" from the voice generator's speaker 106.

Figure 17:
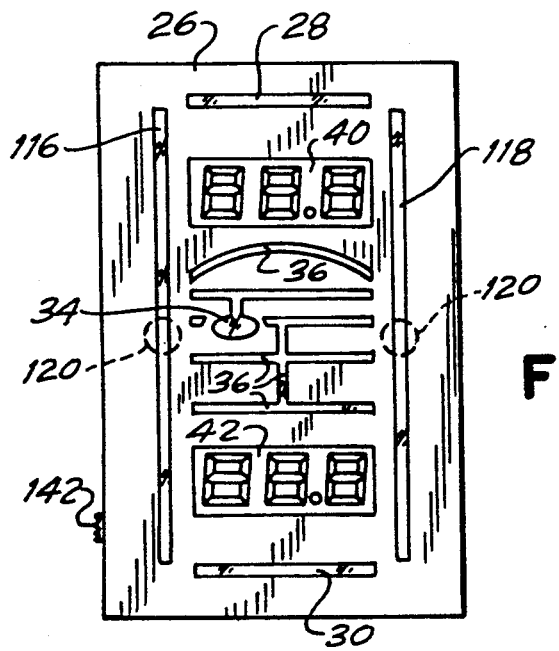
FIG. 17 is a plan view of an alternative simulated vehicle display.

The alternative embodiment of FIG. 17 has a simplified display 26 which is more economical to manufacture and may be more appealing to some drivers. The six circular indicator lights 38 are eliminated and the pairs of side bars 32 are replaced by single, full-length bars 116 and 118. Each of these side bars 116 and 118 can be activated by any one of the three close-range distance detectors on that side of the car and illuminated in amber or red, and can flash to give the driver a sense of danger on the whole side of the vehicle, not localizing the danger. In this embodiment, the front and rear close-range distance detectors 20 and 22 can be coupled with the front bar 28 and the rear bar 30 on the simulated vehicle display 26, in a like manner. Shown in phantom outlines are tricolor lights that can be used to illuminate that side of the display.

The construction of a suitable simulated vehicle display 26 can be seen from FIG. 18 which shows it to be in the form of a box having a rectangular front display panel 122 mounted on a frame 124 which is closed by a rear panel 126. The display panel 122 is formed of a translucent or transparent material and is divided into clear portions for the several illuminated features of the display that have been previously described and offer the general appearance of a vehicle, by means of an opaque pattern of paint or stippling applied to the rear of the panel. This opaque pattern is shown with dots or specks in the figure. The two digital readout LEDs 40 and 42 for the long-range distance detectors 25 and 27 are in the form of two small rectangular boxes that mount to the inside surface of the display panel 122. Behind these LEDs is a rectangular, flexible room-temperature luminescent panel 128 powered through tab connectors 130 which illuminates the simulated vehicle features provided by the front and rear bars 28 and 30, the side bars 32, the steering wheel 34 and the interior markings 36. The luminescent panel 128 is preferably blue to stand out from the normal-condition color of the indicators 38, and has two central openings 132 for wiring the LEDs 40 and 42 and six peripheral openings 134 for six tricolor light elements 138 for the indicator circles 38, which can, as described, be fibre-optic terminator displays. Within the frame 124 at the lower right as viewed and behind the luminescent panel 128 is the warning buzzer 102 which can pulsate at moments of immediate danger. The optical fibers and electric wiring can be carried out to the computer 44 and the light box 68 in a ribbon cable 140 exiting the back of the display. An on/off switch 142 is provided at the lower left, on the side of the frame 124.

Alternatively to the luminescent panel 128, the simulated vehicle features of the display 26 can be lighted by individual incandescent lamps or bulbs, but these tend to provide distorting or distracting centers of light which detract from the overall vehicle image. Furthermore, however small, incandescent lights radiate heat which may be damaging. A luminescent element, by contrast, can provide a cool, even glow of light, and its flexibility makes it easy to handle and install.

FIG. 19 shows an alternative construction of simulated vehicle display 26 in which the panel 122 is replaced by an opaque pattern silk-screened directly on to the luminescent panel 128, and liquid crystal displays (LEDs) 40' and 42' are now mounted directly on that panel.

The embodiment of FIG. 20 shows a design for a simulated vehicle display 26 that can be expressed with a liquid crystal panel. This is a more economical construction but can only be rendered in monochrome, or rather dichrome, with black elements on a light background. A liquid crystal panel 136 has electronically switchable elements corresponding to those already described, which respond to the detection of an external object in a sensitized area in a similar manner to that already described. The circular indicator lights 38 are however replaced by speaker displays 144, and when one of these is activated, arcuate elements 146 suggesting sound waves emanating from the speaker displays, appear.

In the embodiment shown in FIG. 21 the system is provided with a voice generator as described above, and the simulated vehicle display 26 is modified by replacing the digital readout LEDs 40 and 42 with square, resilient on/off buttons 146' and 148 marked for the front and rear of the vehicle respectively. These buttons 146 and 148 can be illuminated to provide and given a distinctive feel or markings so that the driver can identify them with a finger 150 shown in phantom outline, without taking his eyes off the road. This figure depicts only the front and rear long-range distance detectors 25 and 27 which are coupled through the computer 44 to the simulated vehicle display 26. The buttons 146' and 148 are also coupled with the computer 44 to activate the voice generator to provide an announcement of the front or rear distance of an external object when the respective button 146 or 148 is depressed.

As a frontal or rearward situation develops, the driver can touch one of the buttons 146' or 148 to get the information he is looking for, by way of a verbal announcement of his distance, for example "Twenty-eight feet. Twenty-eight feet."

Figure 22:
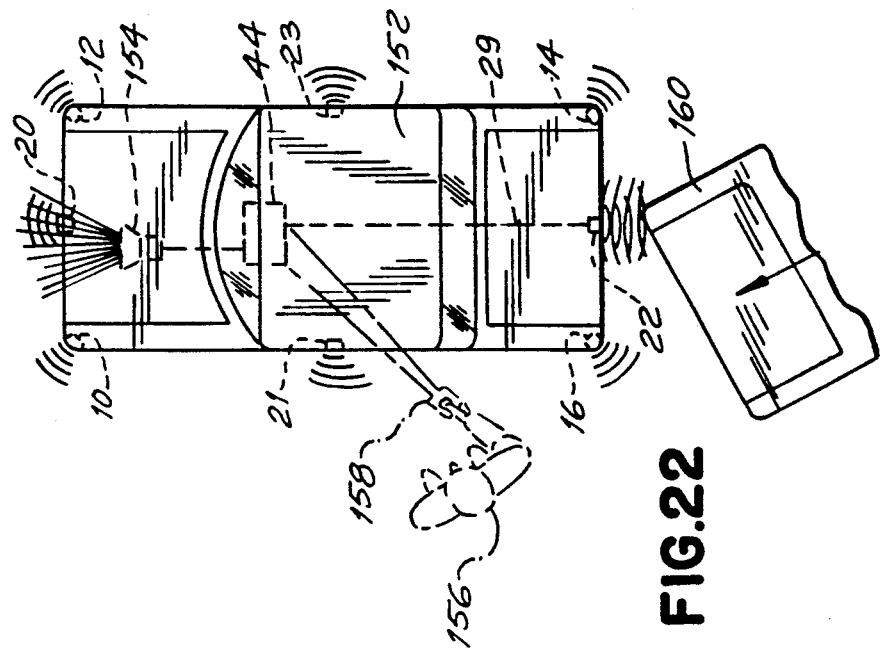
FIG. 22 is a diagrammatic representation of the development of one of the systems shown in the preceding figures to provide a defensive means on a parked car.

FIG. 22 illustrates a vehicle 152 provided with a vehicular proximity sensing system as described herein which has the additional valuable feature of being provided with an external audible warning system, in this case the computer 44 is coupled to the vehicle's horn 154 to activate the horn 154 in response to a signal from one of the close-range distance detectors 10–16 or 20–23. As shown in phantom outline a driver 156 is provided with a hand-held remote control 158 which he is using after leaving the vehicle 152 to activate the vehicular proximity sensing system by means of a signal transmitted from the remote control 158 to a receiver incorporated in a unit with the computer 44.

With the driver away from the host vehicle 152 it is nevertheless now equipped with defense means against being struck by another vehicle. As another car 160 approaches a sensitized area on the host vehicle, in this case the center rear, the corresponding close-range distance detector 22 sends a signal to the computer 44 which in turn activates the horn 154 three or four times alerting the driver of the threatening vehicle 160 to take evasive action. When the danger goes away the computer 44 resets the system to an activated condition to defend against the next threat. In addition to, or instead of the horn 154, a siren can be provided, or existing or additional lighting on the vehicle can be activated and may flash, if desired.

When the driver 156 returns to the vehicle 152 he uses the remote control 158 to deactivate the vehicular proximity sensing system so that he may enter the vehicle 152 without sounding the horn or other warning. The system is then reactivated when the ignition is turned on, or possibly manually, or possibly when the driver activates a door-locking system so as to allow passengers to load or board the vehicle. Alternatively, the system may be activated when the vehicle transmission is engaged.

The embodiments of the invention disclosed and described in the present specification and drawings and claims are presented merely as examples of the invention. Other embodiments, forms and modifications thereof will suggest themselves from a reading thereof and are contemplated as coming within the scope of the present invention.

What is claimed is:

1. A vehicular proximity sensing system to detect the relative approach of an external object to a motorized vehicle, the system having
   a plurality of reflectable energy transmitting-receiving distance-detecting devices disposed around the vehicle's periphery;
   driver-alert means responsive to signals received from the distance-detector devices to alert a driver to approach of the vehicle to within a preselected distance of the external object; and
   electronic signal-processing means for coding a reflected energy signal to be transmitted by the distance-detector devices to have a unique character distinguishing the signal from signals emitted by other vehicles equipped with a similar vehicular proximity sensing system wherein the electronic signal-processing means includes received-signal analyzer means to recognize said coding in received signals and accept or reject them accordingly.

2. The system of claim 1 wherein sad distance-detecting devices comprise ultrasonic transducers.

3. The system of claim 1 wherein said driver-alert means comprises a simulated vehicle display having an illuminated vehicle representation provided with a plurality of illuminating devices to give a driver a visual indication of his or her proximity to said external object.

4. The system of claim 1 wherein said electronic-processing means comprises a microprocessor mounted within said vehicle.

5. The system of claim 1 wherein said electronic-processing means comprises a computer mounted within said vehicle.

* * * * *